Sept. 15, 1953 E. J. DANROTH ET AL 2,652,103
TIRE BEAD BREAKING HAND TOOL
Filed Oct. 25, 1950
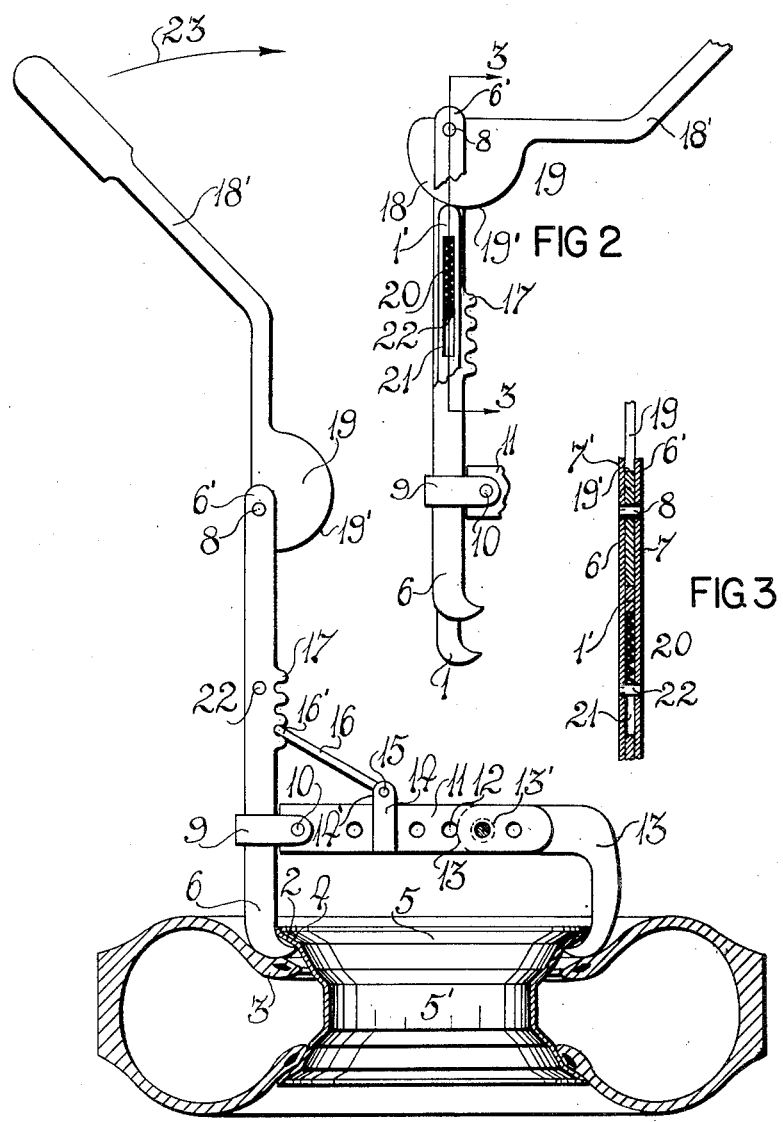
INVENTOR:
EDWARD J. DANROTH & ABRAHAM PETKAU.
Featherstonaugh & Kent
Their Atty's Patented Sept. 15, 1953

2,652,103

UNITED STATES PATENT OFFICE 2,652,103

TIRE BEAD BREAKING HAND TOOL

Edward J. Danroth and Abraham Petkau, Domaine, Saskatchewan, Canada; said Petkau assignor to said Danroth Application October 25, 1950, Serial No. 192,024

1 Claim. (Cl. 157—1.17)

Our invention relates to tire bead breakers particularly to a tire bead breaker of the character herewithin described, an object of which is to provide a device which will perform the function of cleaving the tire bead from its attachment, by ordinary adhesion, to the wheel rim.

A further object of our invention is to provide a device of the character herewithin described which is simply, but effectively, secured to the wheel rim when positioned for bead breaking.

A still further object of our invention is to provide a device of the character herewithin described which is adjustable for various sizes and kinds of tire and wheel combinations.

Still another object of our invention is to provide a device of the character herewithin described which enables the operator to use one hand only, thus freeing the other hand to steady the tire and wheel assembly during the operation of bead breaking.

A further object of our invention is to provide a device of the character herewithin described which includes a novel cam actuated cleaving blade which is operated after the positioning of the device upon the tire rim in order to separate the bead therefrom.

Yet another object of our invention is to provide a device of the character herewithin described which is simple and economical to manufacture and operate, and is otherwise very well suited to the purpose for which it is intended.

With the foregoing objects in view, and such other objects and advantages as will become apparent to those skilled in the art to which this invention relates as this specification proceeds, our invention consists essentially in the arrangement and construction of parts all as hereinafter more particularly described, reference being had to the accompanying drawings in which:

Figure 1 is a vertical section through an automotive wheel and tire assembly, showing our tire bead breaker in situ.

Figure 2 is an enlarged side elevation of a portion of our tire bead breaker in the final position following the completion of a cleaving stroke.

Figure 3 is a vertical section along the lines 3—3 of Figure 2.

In the drawings like characters of reference indicate corresponding parts in the different figures.

Our tire bead breaker comprises a chisel-edge cleaving blade 1, the lower end of which is of curved configuration, the curvature corresponding with the boundary 2 between the tire bead 3 and the retaining bead 4 of the wheel rim 5.

The cleaving blade 1 referred to hereinabove is slideably retained between two guides 6 and 7 which are parallel to and of the same configuration as the said blade 1 itself. These said guides 6 and 7 constitute an incomplete sheath for the blade, and extend vertically beyond the upper end thereof. The upper ends of the said sheathing guides 6 and 7 are drilled through for pivot pin 8 which also serves to fasten the two sheathing guides together, at their upper ends. The lower portion of the said guides 6 and 7 are held together by means of an encircling clip 9, the open ends of which extend to form a drilled shackle, retaining a pivot pin 10.

Pivoting about said pin 10, a horizontal, adjustable transverse supporting arm 11 extends from the aforementioned shackle 9 across the diameter of the wheel 5' when in situ as shown in Figure 1 of the accompanying drawings, and is provided with a series of drillings 12 to permit adjustment. Pin-connected through one of these drillings is a claw end 13 which has a similar configuration to that of the cleaving blade 1, and which hooks over the retaining bead on the wheel rim diametrically opposite the point of application of the said cleaving blade 1. A clevis pin 13' connects the claw end 13 through one of the drillings 12 within the supporting arm 11 and provides means to adjust the effective span of these two components to suit different wheel sizes.

A second clip 14 encircles the transverse arm 11 and is provided with a drilling and pin 15 insertable therein through the two lugs 14' of the clip. About said pin 15, a bracing rod 16 is pivoted, the outer end 16' of which may be inserted in one of a series of coarse serrations 17 which are provided on the anterior edges of the sheathing guides 6 and 7. This said bracing strut 16 which bears upon one of the said serrations, maintains verticality of the upstanding guides 6 and 7.

Adjacent the upper ends 6' and 7' of the vertical guides 6 and 7, a pivot drilling, or punching is provided. Into this a pivot pin 8 is fitted to which reference has been made hereinbefore. This said pivot pin 8 provides the attachment for the operating assembly of our bead breaker and is collectively designated 18.

An operating handle 18' which rotates about said pivot pin 8 is provided and is an angulated lever handle, with a portion angulated posteriorwise. The lower, or operative end of said lever 18' is provided with an eccentrically curved enlargement 19, the configuration of which is cam-like, as is its function.

Within the aforementioned guides 6 and 7, the extension 1' of blade 1 is capable of vertical, sliding reciprocation when lever handle 18 is rotated about pivot 8, because the end of said blade extension bears upon or is maintained in contact with the curvilinear edge 19' of cam-end 19 of said lever handle.

This contact between blade extension end 1' and cam-end 19 is maintained by a return spring 20 which is retained within a slot 21, provided in said blade extension. The lower end of the said spring is connected to a pin 22, which extends through the aforementioned slot 20 in blade extension 1 and through both blade guides 6 and 7.

The said pin 22 also serves to provide a guide upon which the blade 1 reciprocates preventing misalignment of the blade and guides 6 and 7. The spring 21 which is retained in slot 20 and between the guides 6 and 7 bears upon the upper portion of said slot and work in opposition to the lever handle 18. Thus, contact between cam-end 19 thereof and blade end 1' is maintained.

In operation, the horizontal member 11 is adjusted to ensure that the rim is securely clamped within the claw ends of blade guides 6 and 7, and the claw end 13. The bracing strut 16 is then adjusted to position the guides 6 and 7 substantially vertically. When in position, handle 18 is rotated in the direction of arrow 23 over and downwardly. The edge 19' of the cam end 19 depresses blade extension 1' and in turn causes blade 1 to slide downwardly within its guides 6 and 7. The chisel-edge of the blade hereinabove described, is forced by the pressure brought to bear thereupon, to cleave between the tire bead and tire wheel retaining rim. When necessary the device may then be moved around the perimeter of the rim and so the separating effort initiated to separate the bead of the tire from the rim completely.

It will be appreciated that the movement of the handle 18' in the direction of arrow 23 will tend to misalign the guides 6 and 7 from the vertical position but that this is prevented in one direction by the clip 9 and in the other by means of the diagonal strut 16.

Since many modifications can be made in the invention herein described and since the accompanying drawings have been prepared only to illustrate the relative arrangement and interaction of parts and not with regard to accuracy of dimensions for manufacturing purposes which in view of this disclosure we consider to entail merely mechanical skill together with the skill of the mechanical draftsman, and since many apparently widely different embodiments of this invention may be made within the spirit and scope of the accompanying claim without departing from such spirit and scope, it is intended that all matter contained in the accompanying specification shall be interpreted as illustrative only and not in a limiting sense and we desire only such limitations placed thereon as justice dictates.

What we claim as our invention is:

A device for separating tire-beads from the associated wheel rim, comprising in combination a pair of vertically situated guides, the lower ends of said guides engaging a portion of the rim flange when in operative position, a substantially horizontal supporting arm pivotally connected to said guides and spanning said wheel diametrically when in operative position, an arm extension connected to said arm by a pin, said extension being provided with a claw-end for engaging said rim at a point substantially diametrically opposite said guides, means for maintaining the verticality of said guides with said supporting arm, said means including a bracing strut pivotally connected to said arm, serrations upon the anterior edges of said guides, the outer end of said strut selectively engageable within one of said serrations, a cleaving blade vertically reciprocable within said guides and adapted to engage a portion of said tire-bead beneath the rim flange engaged by said guides, and an operating assembly for effecting relative vertical movement between said guides and said blade, said operating assembly including an operating handle, a cam-end upon one end of the said operating handle, said cam-end being pivotally connected adjacent the outer ends of said guides, the curvilinear edge of said cam-end engaging the upper end of said blade, said blade being upwardly spring biased to maintain contact between the upper end of said blade and said curvilinear edge of said cam-end.

EDWARD J. DANROTH.
ABRAHAM PETKAU.

References Cited in the file of this patent
UNITED STATES PATENTS

| Number | Name | Date |
|---|---|---|
| 1,983,608 | Hand | Dec. 11, 1934 |
| 2,367,638 | McCulloch | Jan. 16, 1945 |
| 2,495,117 | McCollister | Jan. 17, 1950 |